United States Patent [19]
Schmidt

[11] 3,909,223
[45] Sept. 30, 1975

[54] DUST EXTRACTION EQUIPMENT FOR BULK MATERIAL HANDLING INSTALLATIONS

[75] Inventor: Reinhold Schmidt, Holtwick, Haltern, Germany

[73] Assignee: GFE Gesellschaft fur Entstaubungstechnik AG, Sursee, Switzerland

[22] Filed: May 13, 1974

[21] Appl. No.: 469,371

[30] Foreign Application Priority Data
May 15, 1973   Switzerland.......................... 6870/73
Mar. 12, 1974  Germany............................ 2411653

[52] U.S. Cl. ............... 55/467; 55/484; 55/DIG. 29; 98/115; 143/93
[51] Int. Cl.² ........................................ B01D 46/02
[58] Field of Search............... 55/DIG. 29, 467, 484; 98/115, 36; 143/93

[56] References Cited
UNITED STATES PATENTS
| | | | |
|---|---|---|---|
| 2,074,317 | 3/1937 | Allan et al. | 55/DIG. 29 |
| 3,707,998 | 1/1973 | Dakymple | 141/93 |
| 3,722,397 | 3/1973 | Kempthorne | 98/115 |

*Primary Examiner*—Bernard Nozick
*Attorney, Agent, or Firm*—Malcolm W. Fraser, Esq.

[57] ABSTRACT

Dust extraction equipment for a bulk material handling installation comprises a suction device for drawing air from a discharge compartment of the installation through a series of filters. The compartment has an aperture for the entry of material conveying means and the pressure side of the suction device is connected to nozzles around the aperture whereby an air shield is formed to prevent the egress of dust from the compartment.

6 Claims, 3 Drawing Figures

DUST EXTRACTION EQUIPMENT FOR BULK MATERIAL HANDLING INSTALLATIONS

FIELD OF THE INVENTION

This invention relates to apparatus for the extraction of dust from bulk material handling installations, such as ship unloading installations, wagon tipping installations and the like, including a discharge compartment, which is arranged above a bunker aperture into which conveying means releases the bulk material, together with a suction device, which acts on the discharge compartment, and associated filters.

BACKGROUND OF THE INVENTION

Such apparatus is used to confine the formation of dust which inevitably occurs in the handling of bulk materials to areas that are as small as possible and to prevent the dust which is released from reaching the environment of the handling installations. The apparatus that is in service at the present time is normally so designed that the discharge compartment, arranged above the bunker aperture, or an unloading compartment disposed on top of it, is kept free from dust as far as this is possible. To this end, there are arranged in the interior of the discharge compartment filters or batteries of filters through which the dust-laden air is drawn off with the aid of suction devices. To ensure that the dust-laden air does not escape from the discharge compartment or through the opening of the unloading compartment which is intended for the entry of the conveying means, the suction devices have to be designed for the extraction of large quantities of air and operate in such a way that a constant flow of air is obtained from the atmosphere into the discharge compartment or into the unloading compartment. The speed of this flow of air must be comparatively high if, in the event of a wind blowing, considerable amounts of dust are to be prevented from reaching the atmosphere.

Nevertheless, the known apparatus leave something to be desired as regards their efficiency, and this is so even when they are equipped with suction devices having a very great capacity, because large quantities of air which cannot be absorbed any more by the suction devices are displaced in a short time when the conveying means, that is to say a loaded grab of a crane or a wagon, enters the unloading compartment as well as when the conveying means is emptied over the bunker aperture. These difficulties can only be obviated if the conveying means enters the discharge compartment very slowly and also releases the bulk material in a correspondingly slow manner. However, on account of this, the unloading times of the conveying means are prolonged, the handling capacity of the apparatus is reduced and, for instance in the case of ship unloading installations, the time of anchorage of the ships is prolonged.

It is accordingly an object of the invention to provide apparatus for the extraction of dust from bulk material handling installations with which the escape of dust into the atmosphere can be effectively prevented, whilst the capacity of the bulk material handling installation is fully exploited.

SUMMARY OF THE INVENTION

The invention resides in the connection to the suction device, at the pressure side thereof, of distributing channels which terminate in nozzles which are arranged adjacent to the aperture of the discharge compartment, whereby air issuing from the nozzles forms an air shield above or in the aperture. With apparatus according to the invention, the formation of the required airflow conditions in the discharge compartment is no longer left to the capacity of the suction device alone; on the contrary, there is produced, adjacent or around the aperture, a directed air current which effectively shields the discharge compartment against external influences and vice versa with the aid of an air shield created by the airflows emitted by the nozzles. These airflows serve to produce an air shield which is effectively dust-tight relative to the atmosphere by using extracted air from the suction device, in which connection the air emanating from the nozzles conducts the raised dust directly into the suction stream of the filters. This enables a saving in capacity of the suction device of up to 50% and provides, over and above this, the possibility of keeping the bulk material handling installation free from dust in an economical manner with the aid of any desired conveying means.

By the use of apparatus according to the invention, it is ensured that the conveying means which is to be unloaded is situated in an enclosure that is sealed off from the atmosphere. The entry of the conveying means through the air shield does not present any control problems, so that the full capacity of the handling installation can be exploited. Even if, upon the unloading of the conveying means, large amounts of dust are released, it is nevertheless practically impossible for the dust to escape into the atmosphere, because the dust is caused to pass directly to the filters by the airstreams or jets emitted by the nozzles.

Several possibilities exist for the further development of the invention. For instance, it is preferred to arrange the nozzles at an angle to the general plane of the aperture. In this connection, depending on what the operating conditions and the atmospheric conditions necessitate, the nozzles can either be directed away from the discharge compartment, so that a bell-shaped air shield is formed, or they can be directed towards the discharge compartment, whereby a particularly effective sealing of the compartment is achieved whenever it is feared that strong and gusty winds might cause a disturbance of the air shield. According to a preferred embodiment of the invention, the nozzles are arranged in swingable manner.

In addition, it is desirable to equip the distributing channels with adjustable control flaps, through which a portion of the air that is conveyed by the suction device can be emitted to the atmosphere, so that the pressure gradient between the atmosphere and the discharge compartment can be adjusted at any time. A partial vacuum, which contributes in preventing the escape of air and dust into the atmosphere, can be adjusted with the aid of the control flaps.

Various possibilities exist for the arrangement of the nozzles in the region of the aperture. For instance, it will not always be necessary to provide nozzles which emit directed air jets at all positions around the aperture; in some cases it will be sufficient to mount nozzles on only a portion of the edge of the aperture, provided that a continuous air shield is produced in the aperture or above the aperture. In an embodiment with a discharge compartment of rectangular form in plan having at its front end an aperture for the entry of the conveying means, the arrangement should be such that the nozzles are arranged on the vertical walls of the discharge compartment which bound the aperture. A complete air shield is formed over the aperture with the aid of the nozzles.

In another embodiment, in which the aperture is situated in the top or upper wall of the discharge compartment, it is desirable to arrange the nozzles at the top edge of the discharge compartment, in which connection the air issuing from the nozzles forms a bell-like air shield over the aperture.

The advantages achieved with the invention are to be seen particularly in the fact that an effective dust-tight seal in the form of an air shield is produced through a directed air current over or in the aperture of a discharge compartment in bulk material handling installations, which seal prevents the escape of air and dust into the atmosphere, without representing any obstacle for the entry of a conveying means into the discharge compartment or respectively for the discharge of the bulk materials. Through the arrangement of control flaps in the distributing channels leading to the nozzles as well as through the swingable arrangement of the nozzles, the apparatus according to the invention is so variable that it can always be adapted in optimum manner to the respective operational conditions. What is, however, of essential importance is the fact that the capacity required for the suction device is comparatively low, because the quantities of air used for the formation of the air shield are continuously recycled.

DESCRIPTION OF THE PREFERRED EMBODIMENT

Figure 1:
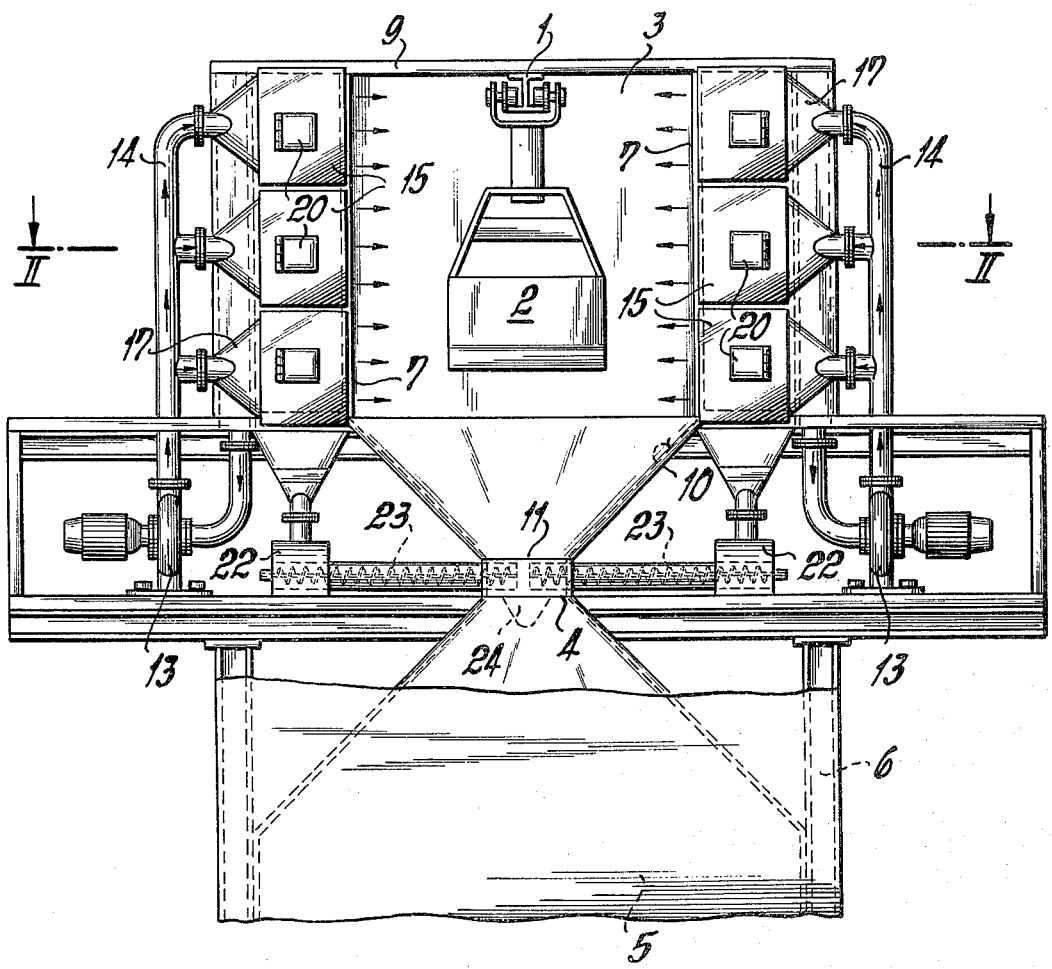
FIG. 1 is a vertical sectional view of an apparatus for the extraction of dust from ship unloading installations.

The apparatus shown in the drawings serves for the separation of dust from a ship unloading installation, which consists substantially of a crane runway 1 with a grab 2 which is movable along this runway 1. The crane runway 1 terminates in an unloading or discharge compartment 3 which is disposed above a bunker aperture 4 of a bunker 5 which can be arranged so as to be stationary or which can also be arranged so as to be movable on a transporting frame. The discharge compartment rests on a structure 6 which can be moved along a harbour or quay installation (not shown). The discharge compartment 3 is bounded by side walls 7, a rear wall 8 and a roof 9 as well as by a funnel-shaped base 10 in which there is disposed an unloading aperture 11 which is arranged above the bunker aperture 4.

Figure 2:
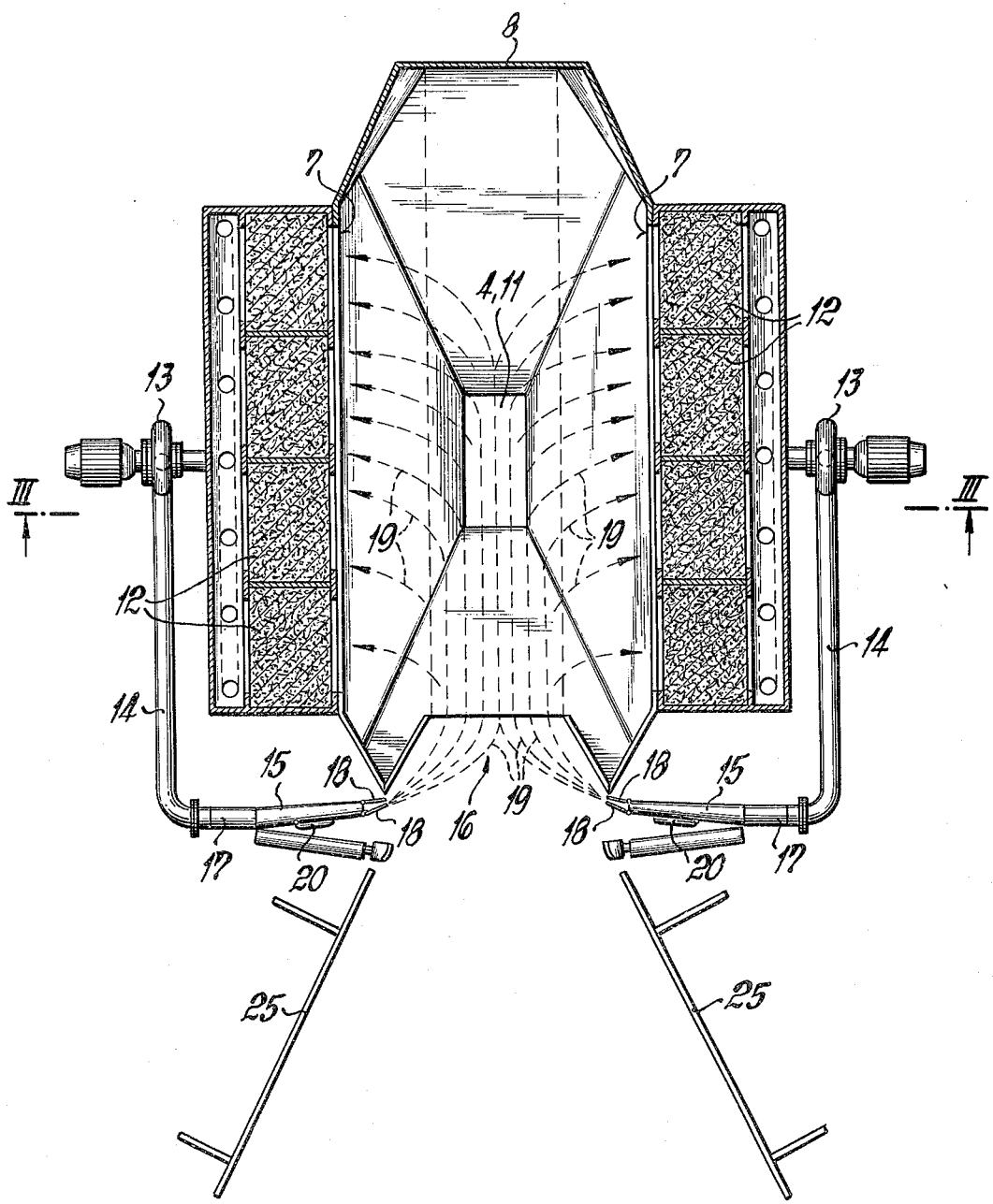
FIG. 2 is a section in the direction indicated at II—II through the apparatus of FIG. 1.
Figure 3:
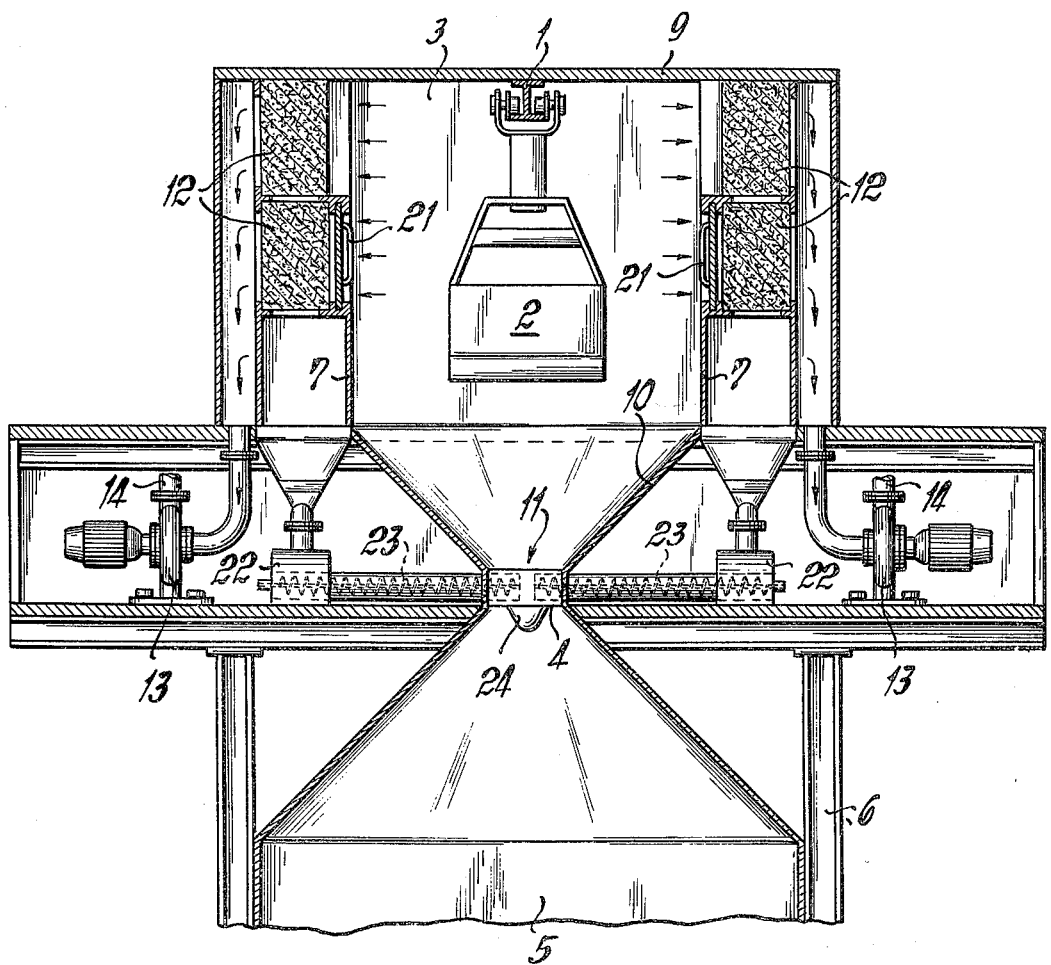
FIG. 3 is a section in the direction indicated at III—III through the apparatus of FIG. 2.

Adjacent to the side walls 7 of the discharge compartment 3 there are filters 12 which are designed as pocket filters in the particular embodiment shown. The filters 12 are acted upon by the suction pumps 13 of a suction device by means of which the air is withdrawn from the discharge compartment 3. Adjacent to the suction pumps 13 there are, at the pressure side, distributing channels 14 which terminate in nozzles 15 which are disposed in front of the free aperture 16 of the discharge compartment 3. In the embodiment shown in the drawings, the nozzles 15 consist of vertical channels 17 which are arranged on the side walls 7 adjacent the aperture 16 and which possess swingable or tiltable flaps 18 with which the airstreams or jets issuing from the nozzles 15 can be directed. Broken lines 19 are shown in FIG. 2 to indicate how the air jets issuing in the plane of the aperture 16 are guided from the nozzles 15 to the filters 12. The directions of the air jets issuing from the nozzles 15 can be varied by adjustment of the positions of the flaps 18.

Moreover, the distributing channels 14 contain control flaps 20 through which a portion of the air which is withdrawn by the suction pumps 13 through the filters 12 can be evacuated to the atmosphere, so that, in addition, there is produced in the discharge compartment 3 a partial vacuum which prevents the escape of air and dust from the discharge compartment 3. The flow of air in the discharge compartment 3 can be additionally influenced with the aid of cover plates 21 which are displaceably arranged in front of the filters 12.

Disposed beneath the filters 12 there is a dust collector in which the dust dropping from the filters 12 is collected and is fed to the bunker 5 via a flanged worm conveyor 23 by means of delivery apertures 24 in the base 10. A separate treatment of the separated dust is therefore not necessary. The apparatus shown in the drawings also includes cleaning devices, not shown in detail, for the filters 12 as well as, in front of the aperture 16, guide plates 25 which are intended to facilitate the entry of the grab 2 into the discharge compartment 3.

What is claimed is:

1. Apparatus for the extraction of dust from bulk handling installations in which the load is discharged into a bunker, comprising
   means providing an unloading compartment adapted to be disposed above the inlet to the bunker, said compartment being closed except for an inlet aperture into which the load is delivered and an outlet opening to the bunker, two series of air filters oppositely arranged within said compartment between which the load passes to said outlet opening,
   a conduit common to each series of filters for drawing air from said compartment through the respective filters,
   nozzle means connected to the outer end of each conduit constructed and arranged to direct streams of air to said inlet aperture for creating an air shield at the aperture to prevent egress of dust, and
   suction pumps for and connected to each of said conduits respectively for drawing air through said filters and forcing same to said nozzle means.

2. Apparatus as claimed in claim 1, in which each nozzle means comprises a series of nozzles inclined to the plane of said inlet aperture.

3. Apparatus as claimed in claim 1, comprising flaps for each conduit controlling openings therein through which a portion of the air withdrawn by said suction pumps can be evacuated to atmosphere for creating a partial vacuum in said unloading compartment.

4. Apparatus as claimed in claim 1, comprising a dust collector below each series of filters, and means for feeding the dust in said collector to the bunker.

5. Apparatus according to claim 1, wherein the discharge compartment is of rectangular form in plan and is provided at its front end with an aperture for the entry of the conveying means, and wherein the nozzles are arranged on the vertical walls of the discharge compartment which bound the aperture.

6. Apparatus according to claim 5, wherein guide plates are disposed externally of the inlet aperture to facilitate entry of the load conveying means into the aperture.

* * * * *